INVENTOR.
CHARLES A. WINSLOW
BY
ATTORNEY

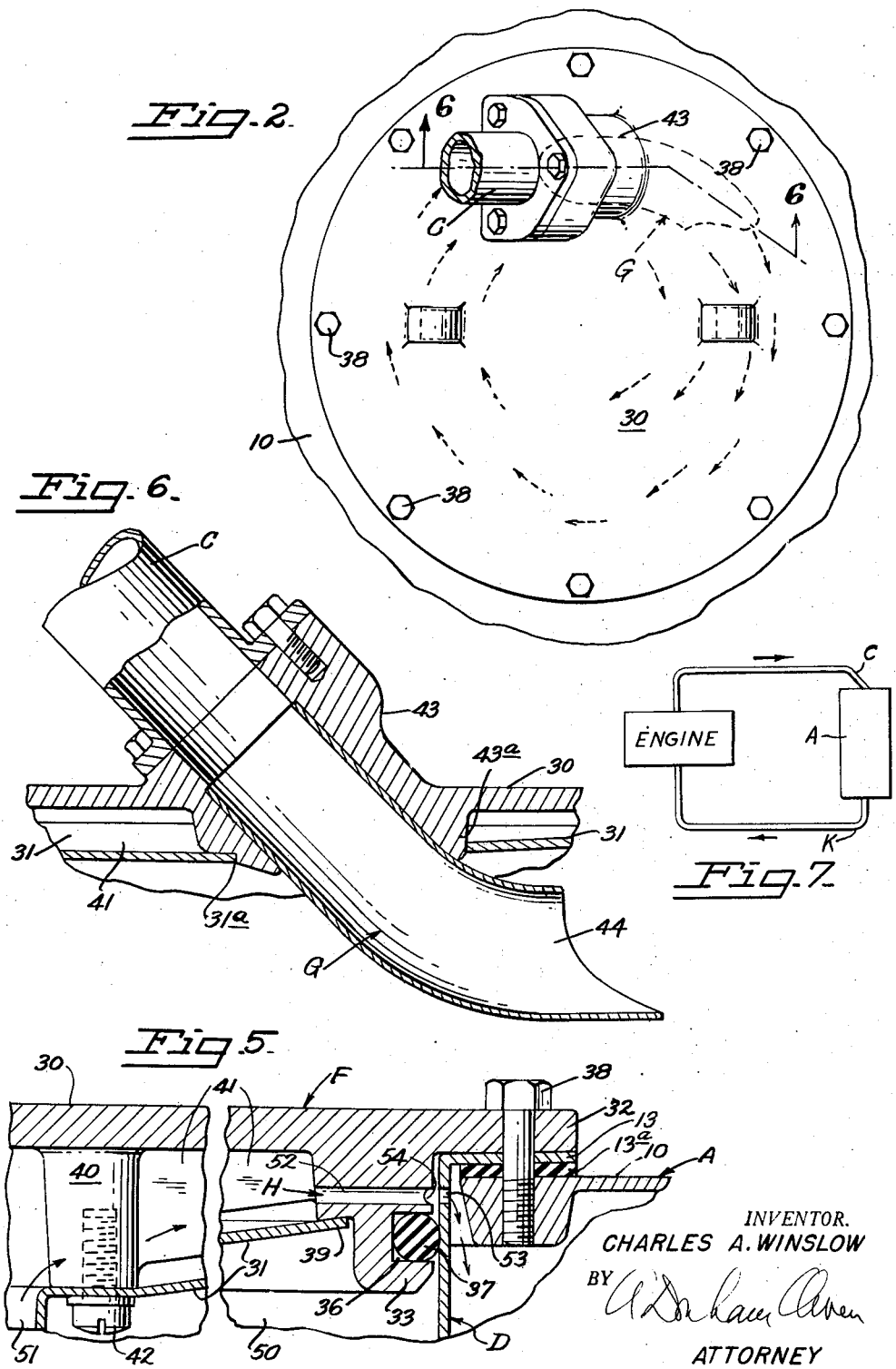

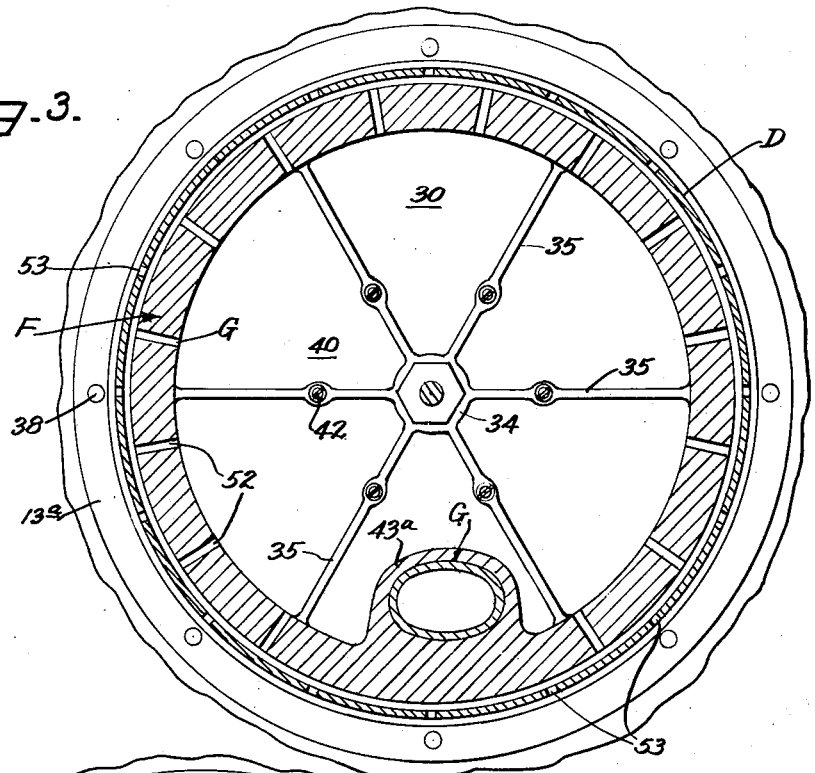
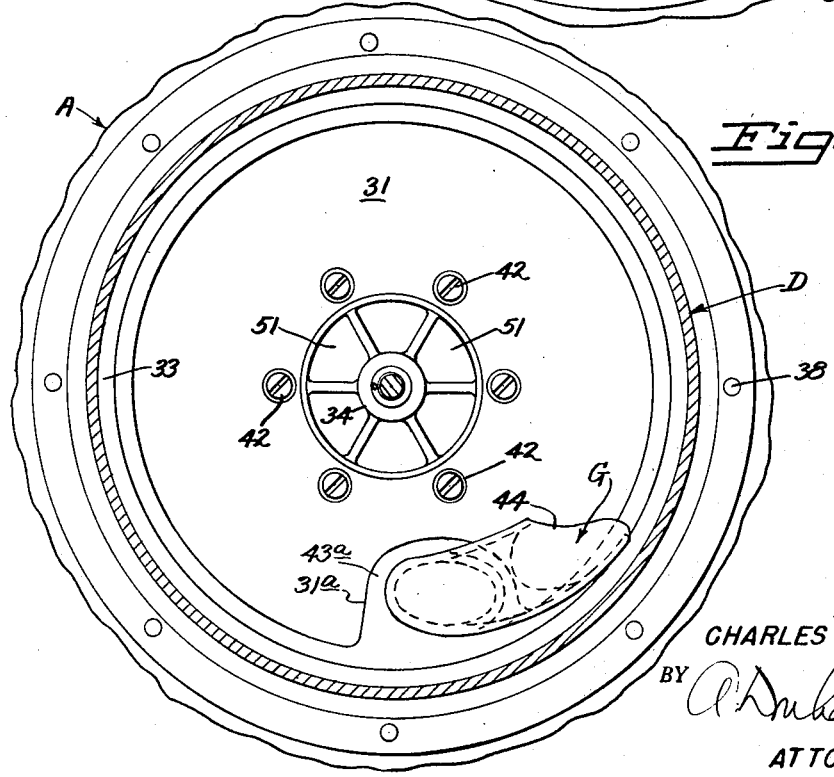

United States Patent Office 2,811,218
Patented Oct. 29, 1957

2,811,218

OIL FILTER AND AIR SEPARATOR

Charles A. Winslow, Oakland, Calif.

Application October 18, 1954, Serial No. 462,921

16 claims. (Cl. 183—2.5)

This invention relates to improvements in lubricating systems of a type employing filters or separators to purify and condition the lubricating fluid, and, more particularly, to a full-flow lubricant filter and gas separator for the lubricating systems of aircraft engines or other engines adapted for operation in rarefied atmospheres.

Conventional airplane engines normally use an oil tank in the wing section from which oil is drawn for lubricating the engines under pressure. The used oil is drawn from the lower extremities of the engine by a scavenger pump or pumps and discharged back into the oil tank. This lubricating system is normally called a dry sump type pressure system. However, a very serious condition of oil foaming develops with this system, due to the fact that the scavenger pump sucks considerable foamed air along with the returned, used, dirty oil. As a result, flow through the lubricating system tends to create quantities of foam, particularly when operating at high altitudes or under conditions of reduced pressure. The presence of such foamed oil in the system not only prevents effective filtration of the dirty oil, but also interferes with the proper circulation of oil to the engine. In some cases the oil tank may eventually fill with foamed oil, air, sludge, etc., causing engine failure from faulty lubrication. In addition, heat control of the oil in use is seriously affected by the foamed oil so that efficient use of the heat exchanger as a means to warm or cool the oil is prevented. Accordingly, engine warm-up is substantially prolonged and effective cooling of the oil at operating power ranges is prevented.

A primary object of the present invention is to solve the many problems inherent in filtering, deaerating, and circulating foamy oil, particularly on cold starts, so that warm foamy dirty oil withdrawn from an engine may be constantly deaerated, filtered, temperature controlled, and turned to the engine with a minimum loss of engine heat.

Another object of the present invention is to provide a device for deaerating and filtering foamy oil that not only uses the kinetic energy of the circulating lubricant to expel entrained air from the system but which also acts to regulate filtering pressures within the device.

Another object of the invention is to provide a combination air separator and a full-flow, in-line filter in which the flow of separated air is restricted so as to create pressures within the device tending to regulate pressure heads across the filter.

Another object of the invention is to provide a combination filter, gas separator, and filter pressure regulator that is capable of effecting complete removal of foam from foamy oil, and venting and returning it to the oil tanks of lubricating systems.

A further object of the invention is the provision of a vertically disposed filtering housing within the oil tank of a conventional large airplane, in which dirty foamy oil is brought in at the top through a common inlet. The oil and air are separated at the top of the cylindrical housing. The air and all foam, gas, etc. is forced out through restricted orifices in the top of the cylindrical filter housing and the heavier oil is forced down through the filtering section within the housing by the resistance of the gas, foam, etc. through restricted outlets at the top of the filter housing. Thus the oil is forced through the filter to the lowest extremity of the housing free from foam or entrained bubbles containing air, gas, etc.

A still further and important object of the invention is the provision of a vertically disposed housing provided with a common air and oil inlet at the top, said air and oil when at the inlet being foamed to such a degree that it is no longer safe to use as a lubricant in an engine. Means within the housing cause the air and oil to be separated, the air being forced through restricted orifices in the top of the casing causing pressure to be exerted on the separated oil below and forcing the oil downwardly away from the foam through a filter to the opposite extreme end of the cylindrical housing thus providing a lubricant clarified of foam, grit contaminants, etc., and again suitable for safe use as a lubricant in a conventional airplane engine.

Other objects and advantages of the present invention will appear from the following description and from the drawings in which:

Fig. 2 is a top plan view of the device of Fig. 1, also broken away in part.

Fig. 3 is a view in horizontal section along the line 3—3 of Fig. 1.

Fig. 4 is a like view along the line 4—4 of Fig. 1.

Fig. 5 is an enlarged fragmentary view of a portion of the device of Fig. 1, showing in greater detail a restricted air vent system useful in regulating filtration pressures.

Fig. 6 is a view in vertical section along the line 6—6 of Fig. 2, showing details of the inlet passage into the lubricant filter.

Fig. 7 is a diagram of a lubricating system employing this invention.

Figure 1:
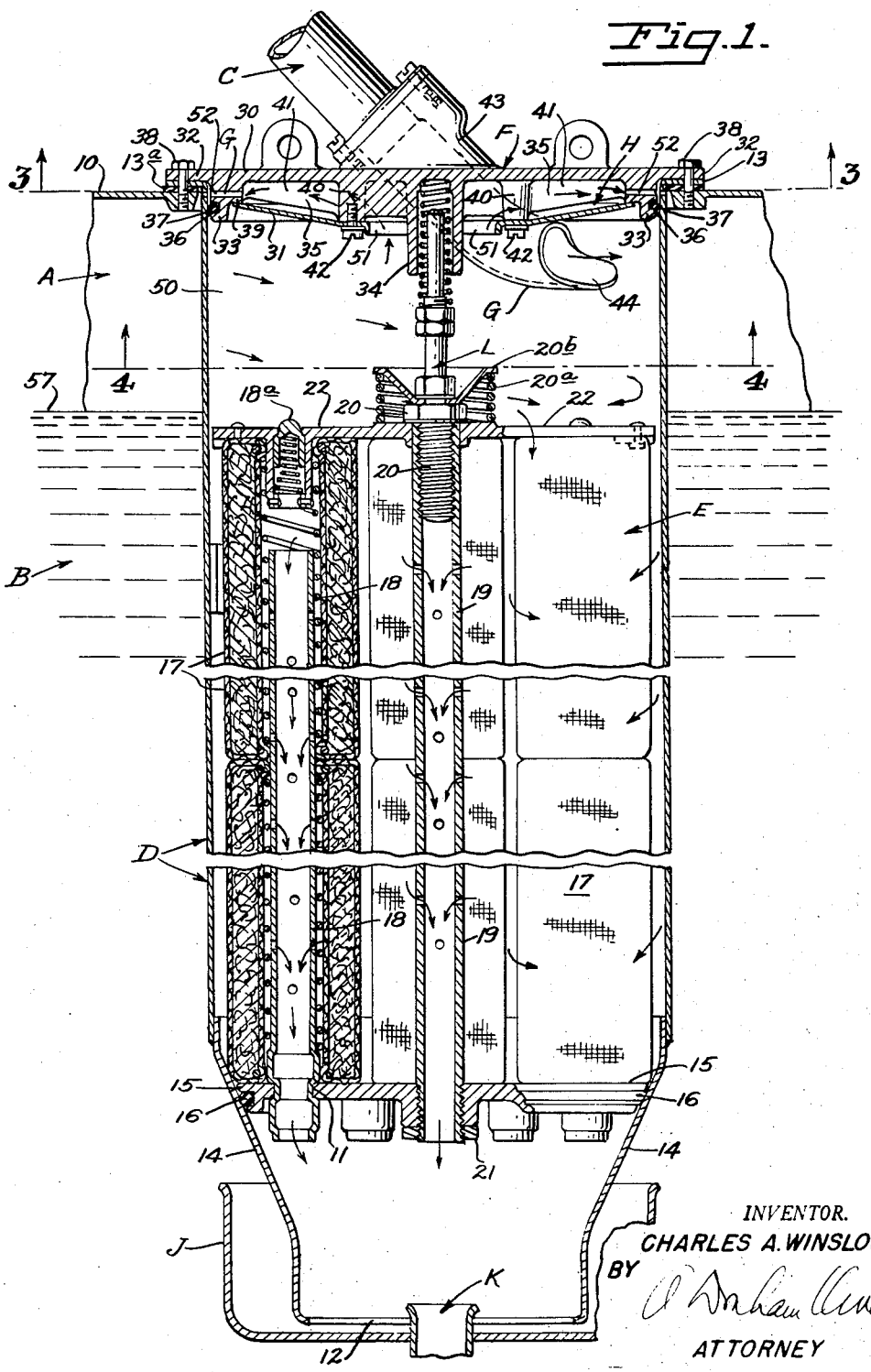
Fig. 1 is a view in section of an illustrative device, showing the manner in which the device might be mounted in the top wall of a larger oil tank. In the view, parts are shown in elevation while others are broken away for the sake of clarity.

Referring to Fig. 1, A indicates a conventional lubricant tank such as an oil tank mounted in the wing section of an airplane. In the usual dry-sump type pressure system, lubricating oil B is pumped from the tank A into the lubricating system of the engine and used oil is returned to the tank by scavenger pumps through the return pipe C. The foamy dirty oil generally is filtered by a full-flow oil filter placed in the return line C. However, with conventional filters, the presence of foam in the returning oil prevents effective filtration, effects heat control and generally interferes with proper circulation of oil to the engine.

According to the present invention, the usual oil filter is replaced by a unique combination device for simultaneously deaerating, filtering, and conserving the heat in the circulating oil. In its preferred embodiment the device includes an open ended shell D supported in an upper wall 10 of the tank A, providing a separate, internal enclosure within the interior of the wing tank itself. Positioned in the lower end of the shell so as to interrupt lubricant flow through the shell is a full flow filter unit E. The upper end of shell D is provided with a closure F, providing a fluid connection with the return line C. Passing through the closure F is a tangentially directed inlet passage G, which uses the kinetic energy of the entering oil to induce a rotating vortex of air and oil in the space above the filter E. Centrifugal force generated by the rapidly whirling mass causes the heavier oil to separate from the less dense, entrained air which moves toward the center of the vortex. As the entire system is under pressure, substantial air pressures are created in the top of the device by the inward displacement of separated air. By providing a restricted air vent system H in communication with the center of the rotating vortex, these air pressures may be used to both expel the separated gases and to force the deaerated oil through the filter E.

The centrifuged oil is conditioned, by deaeration, for effective filtration through the filter unit E, with the filtered oil passing from the filter unit into a cup J surrounding the lower end of the shell D. From the cup J warm, clean deaerated oil may be pumped directly to the engine through feed pipe K, without circulating through the main wing oil tank A. Accordingly, the device operates not only to remove filterable materials from the returned oil, but also to quickly warm the circulating oil, to effect complete deaeration of the oil prior to filtering, and to maintain effective pressures driving the oil through the filter.

Referring to the drawings in more detail, the filter shell D is shown as having an open bottom 12 and a supporting flange 13 which is adapted to seat in sealing relation against the upper wall 10 of the tank A. The full-flow filter unit E is supported on a lower tapering wall portion 14 of the filter shell by a plate 15. An annular sealing ring 16 is recessed in the periphery of the plate 15 to effect a fluid seal with the filter shell 14. As a result, flow circulated through the filter must of necessity pass through one of the filter elements 17 before it can pass into the cup J through the opening 12. The individual filter elements 17 may be of any conventional design in which filtration occurs from the outside in, but preferably are of the "dual-flow" type described in U. S. Patent No. 2,559,267, whereby cold-weather clogging is reduced to a minimum.

As shown in Fig. 1, the outer ring of elements 17 have central apertured tubes 18 rigidly supported on the plate 15, as by expansion joints 11, while the center element has a somewhat longer tube 19 threaded at its ends to receive the element compressing bolt 20 and tube locking nut 21. The upper ends of the outlet tubes 18 are sealed by conventional by-pass valves 18a. Completing the filter unit E is an apertured top plate or spider 22 which is tightened down on the filter elements 17 by the spring 20a and concave washer 20b, so that the elements are firmly spring pressed and positioned between the two plates 15 and 22. A suitable spring mount and pilot L is also provided to insure sealing the filter unit firmly against the lower wall 14 of the shell D. It will be apparent to one skilled in the art that filtration occurs when the oil flows down and inwardly through the filter elements 17 and out through the lower ends of tubes 18 and 19, as indicated by the flow arrows. The purpose of the filter unit E is to insure that the total flow of deaerated oil circulated from the engine will be filtered prior to its return to the tank A and recirculation.

As a result of the internal construction of the shell D and filter E, an important object of the invention is realized, namely, the provision of a filter in an aviation lubricating system in which no external pipes are used. Instead, the filtering system is entirely within the shell D within lubricant storage tank A. In the event of a rupture or leak in any part of the filtering system, the leakage is directly back into the oil storage space within the wing tank itself. Another important result of the construction is the provision of a filter within the oil storage tank of a conventional airplane wing which has a single easily disconnected inlet pipe. This allows the entire filter assembly to be withdrawn and serviced at convenient periods, without disturbing any of the main lubricating lines on the engine or lubricating system, except for the one pipe G. In addition, the closure F can be removed and a complete new filtering unit installed to replace a dirty unit. The latter can be cleaned and serviced away from the airplane itself, thus avoiding the hazards normally present working around a hot engine.

In the drawings the closure member F is shown as a machined or cast head 30 to which is rigidly secured a baffle 31. Preferably, the head 30 is a substantially disc-shaped member having a radial supporting flange 32, a cylindrical sealing flange 33, a central hub or protuberance 34 for the spring mount L, and strengthening ribs 35 connecting the hub and sealing flange. The diameter of the cylindrical sealing flange 33 should be slightly less than that of the filter shell D so that the closure F will just fit into the shell with the radial flange 32 supported on a corresponding flange 13 of the shell D. Preferably, the sealing flange 33 is also provided with an annular groove 36 to receive a deformable sealing ring 37, so that a leak-tight closure will be insured between the head 30 and the filter shell. The combined structure of the filter shell D and closure F may then be supported in the tank wall 10 by the flanges 13 and 32, with a fluid-tight seal being provided in any convenient manner, as by gasket 13a and bolts 38.

Rigidly secured to the head 30 is a dished baffle 31. As illustrated, the baffle 31 is spaced from the head 30 by a collar 39 on the sealing flange 33 and bosses 40 on the ribs 35 so that an air space 41 is produced between the head and the baffle. Any suitable means may be provided to secure the baffle 31 to the head, such as machine screws 42 threaded into the bosses 40.

Providing fluid access to the filter through the head 30 and baffle 31 is a head conduit 43. As shown in Fig. 6, the conduit 43 protrudes above the head to a connection with the scavenged oil return pipe C, and has a downwardly protruding portion 43a, which is received in an opening 31a in the dished baffle 31. An air-tight seal may be provided between the conduit 43 and the opening 31a, as by welding. In this way the head conduit 43 provides an inlet passage G that extends through both the head sealing flange 33 and the baffle 31 to a point adjacent the inner cylindrical surface of the filter shell D. For an effective defoaming action, the inlet passage F should preferably be tangentially disposed with respect to the inner wall of the filter shell D, and preferably should be provided with a nozzle or spout 44 conforming to the curvature of the shell. The function of the inlet passage F is to impart a rapid circular motion to the entering fluid and thereby to initiate gas separation by centrifugal force, as was noted previously.

As best seen in Figs. 3 to 5, air separated by centrifugal force in the space 50 is free to pass upwardly through an annular opening 51 into air space 41. Venting the upper air space 41 is a series of holes 52 in the head sealing flange 33, which connect with a series of relatively minute gas vents 53 in outer shell D. To prevent the necessity of carefully aligning the closure E with the shell D, an annular groove 54 may be provided about the circumference of the sealing flange 33, so that gas escaping from the holes 52 may pass to any of the vents 53. As will be readily understood, the inclined baffle 31, holes 52, and vents 53 form a restricted path H of ever decreasing dimensions along the route of the venting air. Accordingly, the constant displacement of separated air into the central regions of the air space maintains a substantial air pressure in the air vent system, increasing oil pressures across the filter unit D and causing the separated air to blow out the vents 53 into tank A. Any trapped oil from broken bubbles drains down on baffle 30 and back to be filtered through opening 51.

The operation of the device is as follows: used oil drawn from the engine is returned by a scavenger pump along with foam, air, sludge and other contaminating matter through the return pipe C. Kinetic energy received from the pump causes the foamed oil passing in through the tangential inlet passage G and nozzle 44 to be impelled into a rapidly whirling vortex in the space 50, as shown by the arrows in Figs. 1 to 4. This circular motion exerts considerable centrifugal force on the heavier oil portions of the foamy mixture, causing the less dense foam and air bubbles to be displaced inwardly by the outflung oil mass. As the entire system is under pump pressure, the continuing inflow of oil and air quickly builds up back pressures at the center of the whirling mass, causing the separated air to be discharged upwardly through baffle opening 51 and into air space 41. From the space 41, separated air follows a restricted path H through air holes 52 to passage 54, through vents 53, and back into the wing tank A above the normal level 57 of the oil B (Figs. 1 and 5). It should be noted that baffle 31 drains back into separating space 50, permitting practically dry air to blow out through vents 53. The oil, meanwhile, courses down the sides of shell D and through openings in plate 22 to the filter elements 17. Oil discharged by the filters passes outwardly through shell opening 12 into cup J, and then into feed pipe K without passing into the wing tank A. As a result, the intermixing of circulating oil with oil in tank A is gradual, insuring a quick warm-up of the circulating oil.

In the event that more oil and less air is picked up by the scavenger pumps and pumped through the return line, the illustrated apparatus functions to increase the filter pressure, and, consequently, to increase the flow of oil through the filter unit E. This occurs because the added amount of oil entering the separating space 50 tends to increase the liquid phase of the whirling mass until eventually the oil moves into air space 41. After a time, the oil may also restrict the air vent system H by the passage of oil along with the air, causing an even greater build-up of air pressure in the top of air space 41. This increase in air pressure tends also to increase filtering pressures and, consequently, the velocity of oil flow through the filter unit E and out the opening 12 into tank A.

Should the oil completely fill the shell D, a cushion against excessive oil pressures is provided by flow of oil through the restricted vent openings 53. This feature allows the device a range of filter pressures in which substantially all the oil will still pass through the filter unit E without actuating the by-pass valves 18a. Of course, abnormal filtering pressures, such as might result from clogging of a filter element, will open a by-pass valve 18a allowing oil to flow directly down a tube 18 to a tank A.

When more air and less oil enters the device, increased displacement of air toward the center of the vortex will quickly restore the normal oil and air balance in the separating space 50. Further increases in the volume of air entering the space 50 will not affect the normal functioning of the device, since the air will be rapidly vented from air space 41 by vents 53.

From the above description it will be clear that the device of the present invention not only provides full-flow, in-line filtration of all the dirty oil pumped into the filter, but also provides a complete separation of air and oil by a combination of vortical oil flow in a separating space 50 above the filter and a generation of positive air pressure centrally of the vortex. This build-up of air pressure vents the separated air through a restricted path H leading back into the main wing tank. Construction of the restricted vent system so that its inlet 51 is at the center of the vortex and its outlet 53 is separated by a baffle from the inlet passage G not only insures effective separation of the air from the oil, but also allows the pressure of the separated air to be used as a driving force for the filtering operation. In addition, complete deaeration of the oil prior to filtering may be accomplished, thereby insuring an efficient use of the filter unit E in purifying the oil. The ultimate effect is a unique combination of air separating and filtering functions by which dirty, foamy oil is quickly deaerated and effectively filtered.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What I claim is:

1. A combination lubricant defoaming and filter pressure regulating separator device for full-flow lubricant filters comprising: an open-end filter shell having an inlet and an outlet; a full flow filter interposed in said shell between said inlet and said outlet; orifice means at said inlet into said shell to direct entering aerated foamy lubricant into a circular motion; a separator means for separating gas from aerated lubricant comprising air passage means including vents in said filter shell in fluid communication with a central portion of said shell; and means restricting gas flow through the vents to increase pressure within the shell whereby entering foamy lubricant is normally separated in the separator means by a vortex action into liquid and gas phases with the gas phase blowing out said vents and the liquid phase passing through said filter with the restricted gas flow through the vents causing an accumulation of foam therein to increase pressure within the filter shell and facilitate the filtering of lubricant through the full flow filter so that deaeration and filtration of lubricant is had in a unitary operation.

2. The device of claim 1 in which said air passage means also includes a centrally apertured plate located between said inlet orifice and said air vents.

3. A combination lubricant defoaming and filter pressure regulating separator device for full-flow lubricant filters comprising: an open-end filter shell having a separator means for separating gas from foamy lubricant, said separator means including a series of gas vents adjacent one end of said filter shell; a full-flow filter interrupting lubricant flow through said filter shell; a closure for one end of said shell having an inlet passage disposed to direct foamy lubricant entering the shell in a tangentially downward path with respect to the shell; centrally apertured baffle means separating said gas vents from said inlet passage so that gas displaced by centrifugal force from foamy lubricant will pass through said central aperture to said gas vents, and means restricting gas flow through the vents to increase pressure within the filter shell whereby the restricted flow of gas through the vents causes an accumulation of foam therein which causes pressure to be increased within the shell which facilitates the filtration of lubricant through the filter so that deaeration and filtration of lubricant is had in a unitary operation.

4. The device of claim 3 in which said inlet passage is provided with nozzle means whereby lubricant enters said shell in the form of a jet so that the separated gas is forced out of said central opening by a positive pressure vortex action.

5. A separator, including in combination a housing having generally vertical side walls, a cap, and an open lower end; a filter assembly inside said housing below said cap and above said lower end; a baffle means spaced down from said top wall and sealed at its outer periphery to said side wall and having an axial opening thereon, a separator means for separating gas from lubricant including restricted conduit means of small diameter for conducting gas out through said housing from the space between said baffle and said top wall, the axial opening in said baffle means providing an inlet to said space from the portion of the housing therebelow, said filter assembly being spaced a substantial distance below said baffle means; and inlet means for conducting a foamy mixture of lubricant and gas through said top wall to a locus below said baffle means and above said filter assembly and generally tangential to said side wall and adjacent thereto, whereby the entering foamy lubricant is whirled about in the housing above the filter assembly, causing a vortex, whence gas-free lubricant settles toward the filter assembly from the outside thereof, while gas passes in the inner periphery of said baffle means to the space between said baffle means and said top wall and through said restricted conduit means, the small diameter of said conduit means restricting passage of gas therethrough and causing pressure to build up in the housing and aid in the filtration of said lubricant and in forcing gas out said restricted conduit means, thereby combining filtration and degasification in a unitary operation.

6. The lubricant purifier of claim 5 wherein said filter assembly comprises a plurality of filter cartridges extending generally vertically and each having an axial conduit therethrough for conducting out lubricant filtered in generally radially from the outside walls of said cartridge, a lower closure plate for said plurality of filter cartridges, imperforate except for openings through which said conduits extend, said plate being sealed tightly against said side wall so that the lubricant above can pass therethrough only via said conduits, an upper spider aligning the upper ends of said cartridges, and spring means between said upper spider and said flanged top wall for holding said filter assembly removably in place.

7. A separator, including in combination a housing having generally cylindrical and vertical side walls, a top wall, and an open lower end having an outlet leading therefrom; a filter assembly comprising a filter cartridge means extending generally vertically and having axial conduit means therethrough for conducting out oil filtered in a generally radial direction from the outside walls of said cartridge means, a lower closure plate having openings for said conduit means and being otherwise imperforate, said plate being sealed tightly against said side wall so that lubricant thereabove can pass to the outlet only via said conduit means, a spider at the upper end of said cartridge means, and spring means between said spider and said top wall for holding said filter assembly removably in place; baffle means spaced down from said top wall and sealed at its outer periphery to said side wall, a separator means for separating gas from lubricant including gas conduit means of small diameter provided for conducting gas through said housing from the space between said baffle and said top wall, said baffle means having an axial opening therein providing an inlet to said space from the portion of the housing therebelow, said spider being spaced a substantial distance below said baffle means; and inlet means for conducting a foamy mixture of oil and gas through said top wall to a locus below said baffle means and above said filter assembly and generally tangential to said side wall and adjacent thereto, whereby the entering foamy oil is whirled about in the housing above the filter assembly, causing a vortex, whence gas-free oil settles toward the filter assembly from the outside, while gas passes in the axial opening in said baffle means to the space between said baffle means and said top wall and through said gas conduit means, the small diameter of said gas conduit means restricting passage of gas therethrough and causing pressure to build up in said housing and aid in the filtration of lubricant for supplying oil under pressure through said outlet, and for forcing gas out said gas conduit means, thereby combining filtration and de-gasification in a unitary operation.

8. A lubricant separator for removing entrained air and gas from foamy dirty lubricating oil and for utilizing the pressure of the removed air and gas to force filtration of the dirty de-aerated and de-gassed oil, including in combination; a housing element having a cylindrical upper portion with a generally tangentially disposed inlet means for directing said foamy, dirty oil into said housing portion in a vortex that tends to send the oil centrifugally outwardly and the air and gas in toward the center, and a lower portion with a clean-oil outlet therefrom; a full-flow filter in said housing between said inlet means and said outlet and offering resistance to the passage of oil therebetween; and a separator for separating air and gas from lubricant including an outlet having means to restrict flow of air and gas from said housing, said outlet being located near the upper end of said upper portion and leading from the radially central part thereof above said vortex, the restricted flow of air and gas therethrough causing increased pressure in the housing to overcome the resistance of said filter and achieve a substantially constant flow of oil through said filter.

9. A lubricant separator for removing entrained air and gas from foamy lubricant and for balancing the pressure of the removed air and gas against the filtering pressure required to maintain full flow of said lubricant during filtration, said separator including in combination a housing having a top wall, generally vertical side walls defining a cylindrical upper portion with a generally tangentially directed inlet means, an open lower end providing a clean-lubricant outlet, lubricant filter means interposed between said inlet and said outlet and restricting fluid flow therebetween, a separator for separating air and gas from lubricant including an outlet having means to restrict air and gas flow from said housing above said inlet means, said tangential inlet means causing foamy lubricant introduced therethrough to be whirled centrifugally about in said upper portion, causing a vortex, from the center of which air and gas pass up said air and gas outlet, the restricted flow therethrough increasing pressure in said housing to force lubricant from the outer part of said vortex down through said filter means to said clean-lubricant outlet.

10. A separator for removing entrained air and gas from foamy lubricant and for balancing the pressure of the removed air and gas against the filtering pressure required to maintain full flow of said lubricant during filtration, said separator including in combination: a housing having a top wall, generally vertical side walls defining a cylindrical upper portion, a lower portion, and an open lower end providing a clean-lubricant outlet; a lubricant filter assembly inside said housing lower portion above said outlet; a separator for separating air and gas from lubricant including a baffle means spaced down from said top wall but a substantial distance above said filter assembly, with an outer periphery sealed to said side walls and a central opening providing a passage for conducting separated air and gas into the space between said baffle and said top wall, with air and gas outlet means through said housing from said space, means restricting flow of air and gas through said outlet means; and inlet means for conducting foamy lubricant into said upper portion in a path generally tangential to said cylindrical upper housing and below said baffle means, whereby foamy lubricant is whirled centrifugally about in said upper portion, causing a vortex, whence de-aerated and de-gassed lubricant is moved to the outside of the vortex and down through the filter assembly, while air and gas from the center of said vortex pass into said passage and thence to said air and gas outlet means, the restricted flow therethrough increasing pressure in said housing, thereby forcing de-aerated and de-gassed lubricant through said filter to said clean-lubricant outlet while some air and gas are forced out said air and gas outlet means by the back-pressure of said filter, so that a steady flow of de-aerated, de-gassed, and filtered lubricant leaves through said clean-lubricant outlet.

11. A lubricant separator including in combination a housing having a top wall, generally vertical side walls defining a cylindrical upper portion, a lower portion, and an open lower end providing a de-aerated-lubricant outlet; filter means inside said housing lower portion restricting the flow of lubricant therethrough, baffle means spaced down from said top wall, sealed at its outer periphery to said side wall, and having a central opening therein providing a passage for separated air and gas into the space between said baffle and said top wall; a separator for separating air and gas from lubricant including air and gas outlet means from said housing leading out from said space, means in said air and gas outlet means providing a restricted flow of air and gas therethrough; and inlet means generally tangential to said cylindrical upper housing and below said baffle means for conducting foamy lubricant into said upper portion, whereby the lubricant is whirled centrifugally about in said upper portion, causing a vortex, whence de-aerated lubricant moves down while air and gas pass up from the center of said vortex into said passage and thence to said air and gas outlet means, the restricted flow therethrough causing increased pressure in said housing to force lubricant through the filter means to said de-aerated lubricant outlet.

12. A separator for a dry sump system of lubrication, said separator comprising, in combination, a housing element, an inlet for conducting aerated foamy lubricant into said housing element, a separator means for separating gas from aerated lubricant, vent means for conveying separated gas from the separator means, means resisting flow of gas through the vent means to increase pressure within the housing element, an outlet disposed remotely from the vent means for conducting lubricant from the housing element, and filter means for filtering lubricant disposed intermediate the vent means and outlet, whereby the restricted flow of gas through the vent means causes an accumulation of foam therein which causes pressure to be increased within the housing element which facilitates the filtration of lubricant through the filter means so that de-aeration and filtration of lubricant is had in a unitary operation.

13. In a dry sump system of lubrication wherein an aerated foamy lubricant is returned from an engine to a lubricant reservoir, the improvement comprising a separator means for de-aerating and filtering the aerated foamy lubricant, said separator means being adapted to be disposed within a reservoir and comprising a housing having an inlet for aerated lubricant, a separator means for separating gas from aerated lubricant, vent means for conveying separated gas from the separator means to a reservoir, means resisting flow of gas through the vent means to increase pressure within the housing, an outlet for conducting lubricant from the housing disposed remotely from the vent means, and filter means disposed intermediate the vent means and outlet for filtering lubricant, whereby the restricted flow of gas through the vent means causes an accumulation of foam therein which causes pressure to be increased within the housing which facilitates the filtration of lubricant through the filter means so that the de-aeration and filtration of lubricant is had in a unitary operation.

14. The structure according to claim 13 wherein the means resisting flow of gas comprises a restricted passage in the vent means.

15. The structure according to claim 13 wherein the means separating gas from aerated lubricant comprises a gas separation chamber defined by a baffle plate disposed between the inlet and the filter means.

16. The structure according to claim 15 including means causing vorticose motion of aerated foamy lubricant in the gas separation chamber.

References Cited in the file of this patent

UNITED STATES PATENTS

| | | |
|---|---|---|
| 169,362 | Le Tellier | Nov. 2, 1875 |
| 1,176,732 | Bouser | Mar. 28, 1916 |
| 2,010,435 | Matheson | Aug. 6, 1935 |
| 2,252,687 | Bassett | Aug. 19, 1941 |
| 2,390,841 | Longden | Dec. 11, 1945 |
| 2,420,115 | Walker et al. | May 6, 1947 |
| 2,443,875 | Spangenberger | June 22, 1948 |
| 2,483,448 | Weitzer | Oct. 4, 1949 |
| 2,507,125 | Townsend | May 9, 1950 |
| 2,705,053 | Morris | Mar. 29, 1955 |
| 2,707,562 | Kasten | May 3, 1955 |